No. 725,657. PATENTED APR. 21, 1903.
J. A. BENNETT.
PIE OR CAKE PLATE.
APPLICATION FILED DEC. 1, 1902.
NO MODEL.
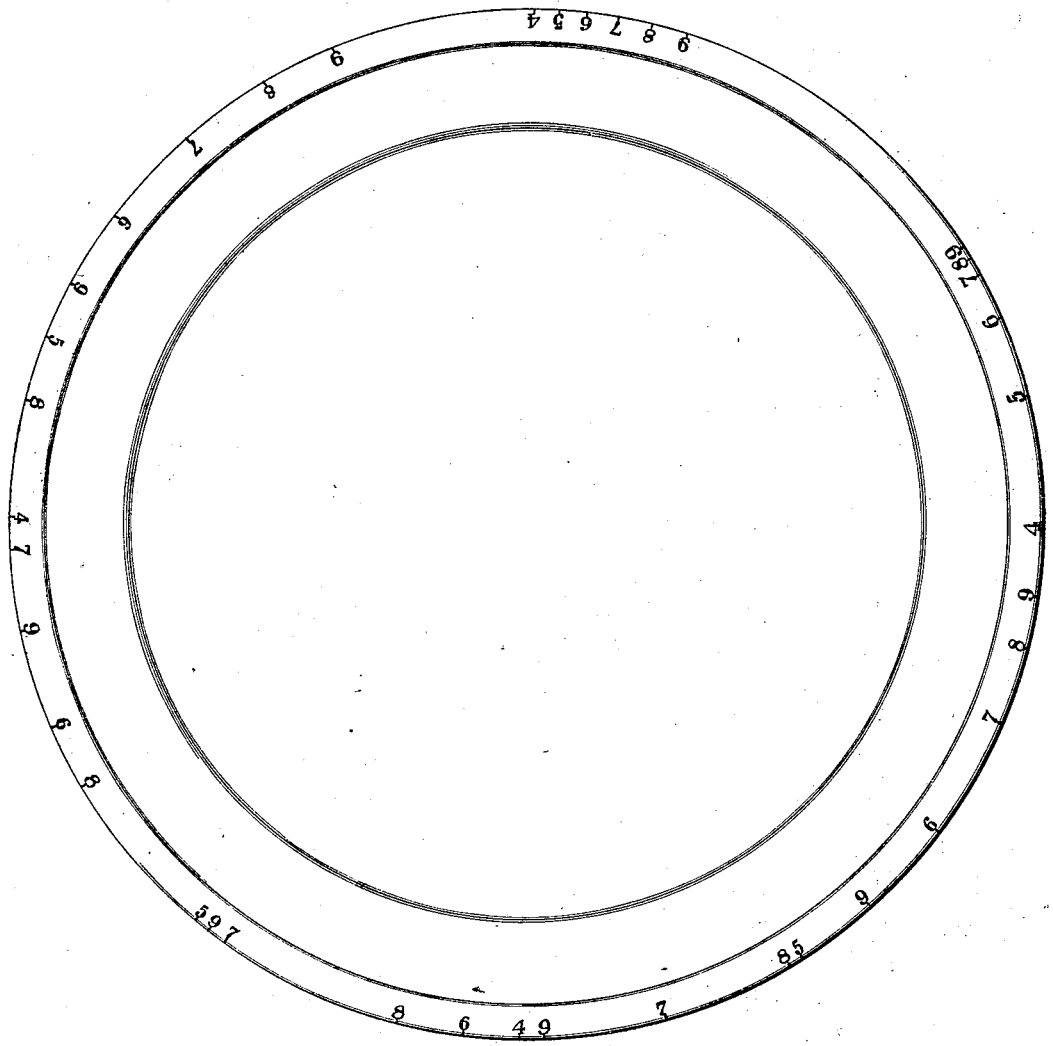
Witnesses:
Inventor:
John A. Bennett

UNITED STATES PATENT OFFICE.

JOHN A. BENNETT, OF HARRISON TOWNSHIP, FRANKLIN COUNTY, KANSAS.

PIE OR CAKE PLATE.

SPECIFICATION forming part of Letters Patent No. 725,657, dated April 21, 1903.

Application filed December 1, 1902. Serial No. 133,530. (No model.)

*To all whom it may concern:*

Be it known that I, JOHN A. BENNETT, a citizen of the United States, residing in Harrison township, (Ottawa post-office,) in the county of Franklin and State of Kansas, have invented a new and useful Improvement in Pie or Cake Pans or Plates, of which the following is a specification.

My invention relates to improvements in pie and cake plates or pans in which the margin or perimeter of the pan or plate has several series of numbers placed upon the margin thereof, so as to indicate the various fractional parts of such margin; and the object of my improvement is to provide a convenient and ready method of cutting or serving in equal portions pie or cake or other pastry and food.

The figure is a plan view of a plate or pan, showing my new improvement.

As shown in the drawing, the material features of my invention consist of numbers or figures so placed upon the margin or perimeter of the plate or pan as to indicate the fractional parts or divisions thereof.

I am aware that plates and pans have been in use having figures and letters stamped or printed on the margin thereof; but I am not aware that pans or plates have been in use where the figures and numbers are used to designate the fractional parts of the margin or perimeter of plate or pan.

What I claim, and desire to secure by Letters Patent of the United States, is—

A pie or cake plate in which suitable characters are so placed upon its margin as to indicate a series of different fractional parts into each one of which the whole circumference is divided.

In testimony whereof I have signed my name to this specification in the presence of two subscribing witnesses.

JOHN A. BENNETT.

Witnesses:
G. D. STINEBAUGH,
F. A. WADDLE.